US007756679B2

(12) United States Patent
Nagafuchi et al.

(10) Patent No.: US 7,756,679 B2
(45) Date of Patent: Jul. 13, 2010

(54) REMOTE MAINTENANCE SYSTEM, MONITORING CENTER COMPUTER USED FOR THE SAME, MONITORING SYSTEM AND METHOD OF COMMUNICATION FOR MAINTENANCE

(75) Inventors: Naoyuki Nagafuchi, Naka (JP); Hidenori Inoue, Hitachi (JP); Toshihiro Morikawa, Naka (JP); Jinichiro Goto, Hitachi (JP); Masatoshi Takada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/902,390

(22) Filed: Sep. 21, 2007

(65) Prior Publication Data

US 2008/0086284 A1 Apr. 10, 2008

Related U.S. Application Data

(62) Division of application No. 11/266,191, filed on Nov. 4, 2005, now Pat. No. 7,509,236.

(30) Foreign Application Priority Data

Nov. 5, 2004 (JP) ............................ 2004-321440
Oct. 6, 2005 (JP) ............................ 2005-293121

(51) Int. Cl.
*G06F 11/30* (2006.01)
(52) U.S. Cl. ....................................... 702/184
(58) Field of Classification Search .................. 702/184
See application file for complete search history.

(56) References Cited

U.S. PATENT DOCUMENTS

| 5,095,365 A | 3/1992 | Takatoo et al. |
| 5,189,394 A | 2/1993 | Walter et al. |
| 6,646,564 B1 * | 11/2003 | Azieres et al. ............... 340/679 |
| 7,312,795 B2 * | 12/2007 | Aso et al. .................... 345/419 |

FOREIGN PATENT DOCUMENTS

| JP | 3-205999 A | 9/1991 |
| JP | 06-243372 A | 9/1994 |
| JP | 10-089960 | 4/1998 |
| JP | 2002-91534 | 3/2002 |
| JP | 2002-091913 A | 3/2002 |
| JP | 2002-124891 A | 4/2002 |

(Continued)

OTHER PUBLICATIONS

Atsuko Eguchi et al, "Software Technologies Toward the Network Era", TOSHIBA REVIEW, vol. 53, No. 8, Toshiba Corporation, 1998.

*Primary Examiner*—Aditya Bhat
(74) *Attorney, Agent, or Firm*—Mattingly & Malur, P.C.

(57) ABSTRACT

A remote maintenance system has a monitoring computer for monitoring a facility and a monitoring center computer for maintenance management. The monitoring computer has a database for storing image data of the monitored facility. The monitoring center computer has a database for storing CAD data for the monitored facility. The monitoring center computer provides coordinates to the image data sent from the monitoring computer, and superposes the image coordinate data and CAD coordinate data for the CAD. The center computer locates a needed maintenance location on the basis of the result of the superposition processing.

6 Claims, 14 Drawing Sheets

FOREIGN PATENT DOCUMENTS

| | | |
|---|---|---|
| JP | 2002-353280 | 12/2002 |
| JP | 2003-156993 | 5/2003 |
| JP | 2003-233418 | 8/2003 |
| JP | 2003-295939 | 10/2003 |
| JP | 2004-302756 | 10/2004 |

\* cited by examiner

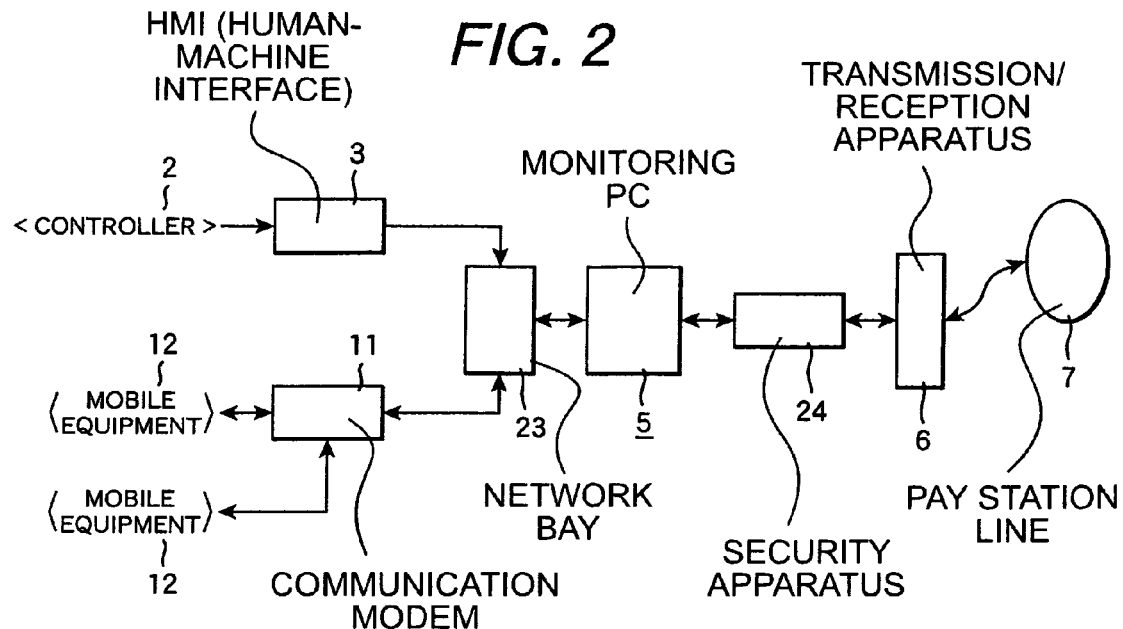

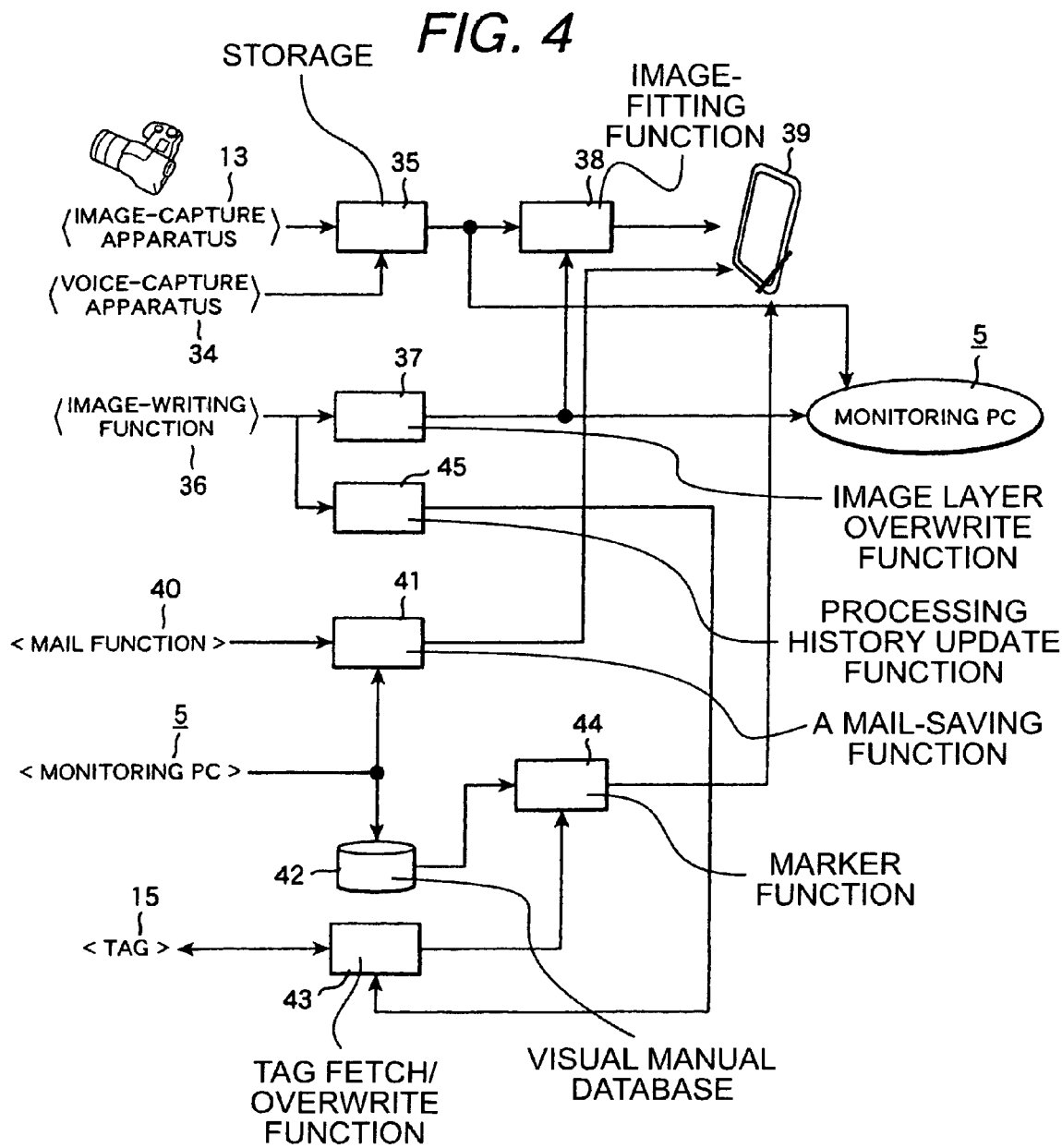

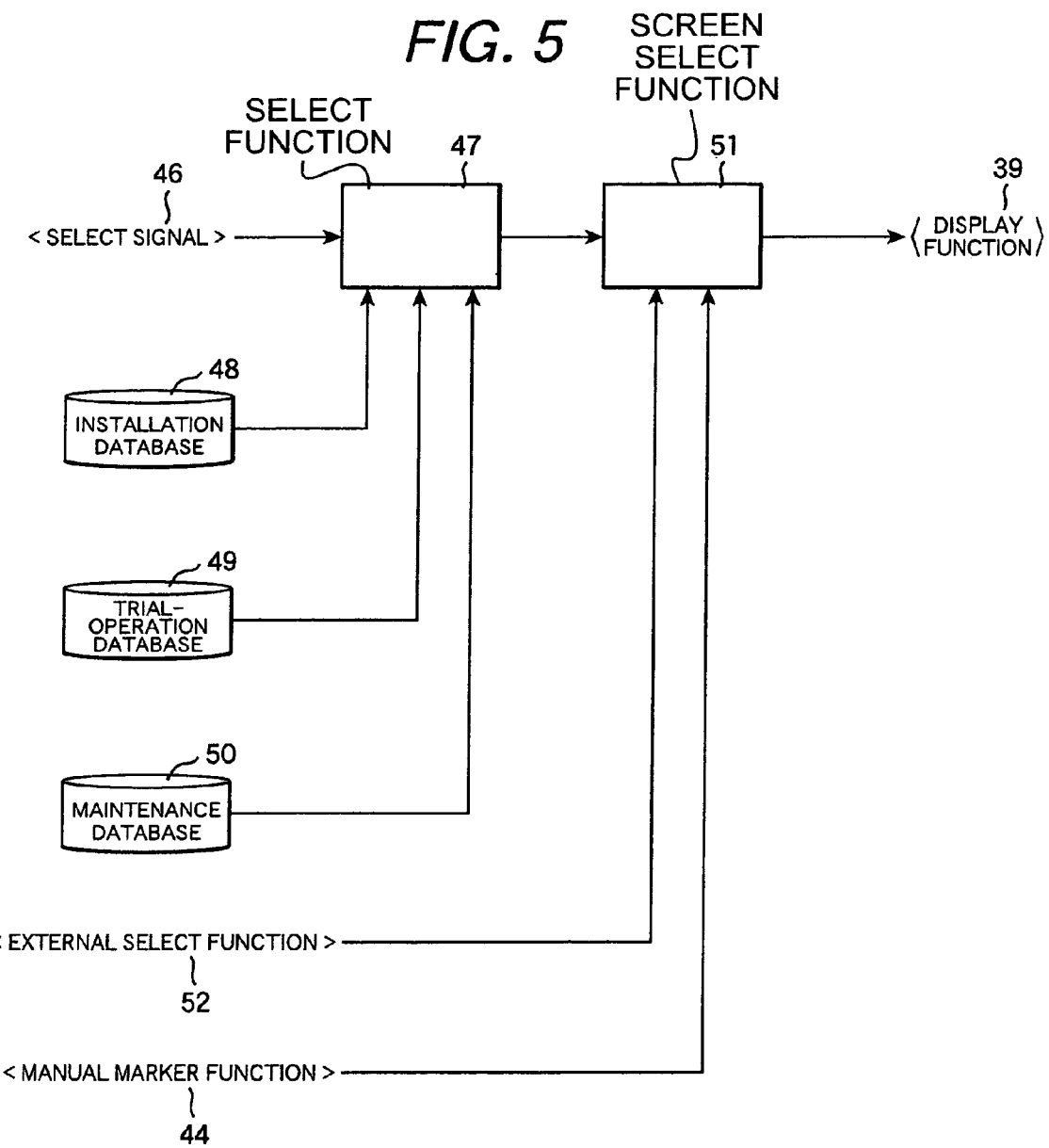

REMOTE MAINTENANCE SYSTEM, MONITORING CENTER COMPUTER USED FOR THE SAME, MONITORING SYSTEM AND METHOD OF COMMUNICATION FOR MAINTENANCE

This is a divisional application of U.S. Ser. No. 11/266,191, filed Nov. 4, 2005 now U.S. Pat. No. 7,509,236, the content of which is hereby incorporated by reference into this application.

CLAIM OF PRIORITY

The present application claims priority from Japanese application serial no. 2004-321440, filed on Nov. 5, 2004, and no. 2005-293121, filed on Oct. 6, 2005, the content of which is hereby incorporated by reference into this application.

BACKGROUND OF THE INVENTION

The present invention relates to a remote maintenance system for aiding in determinations of maintenance and its works at a remote location when periodic plant inspection or plant maintenance is performed.

Mobile equipment is capable of performing information communications through a radio communication or a local area network. On the other hand, tags used in plant maintenance are on their way to be applied in some systems, for example, system for checking on the state of shaft bearing, or system for management of entrance/exit to rooms of controlled areas an atomic power plant.

In the actual plant inspection or the actual plant maintenance, when their works are done, there are various works patterns. For example, in one case, a manufacturer or a maintenance company dispatches an inspection/maintenance instructor to the site of inspection or maintenance. And, the actual works are carried out in dependence on a judgment by him. In another case, a person in charge of facility maintenance may directly carry out works for replacements or repairs of equipment in the facility.

However, in these days of rationalization of man power due to the present business trend or political disturbances in local areas, it is being difficult to dispatch an inspection/maintenance instructor to the site, and to employ skilled workers. Instead, needs for indirectly performing work instructions at a remote location being far away from the site is increasing.

On the other hand, while communications are being improved worldwide, in regions of aforementioned political disturbances in local areas and/or regions with very few communication users, only small-capacity communication such as the satellite communication can be performed in many cases as before.

The aforementioned problem gives a big obstacle in the work process for an inspection or maintenance work instruction. To put it concretely, the inspection or maintenance work instruction has a problem that the procedure of the instructed work becomes not clear, or a judgment cannot be done immediately in the event of an unexpected situation.

In addition, due to an insufficient communication capacity and/or a difference in language between both the communication parties, in some cases, it takes long time to communicate an intention of one communication party to the other to make the other understand the intention.

As an improvement, a remote maintenance support system has been made available. The remote maintenance support system provides a technology, by which the maintenance worker in the field can obtain proper information on maintenance from a maintenance information server or from a support person working at a technical support center, and recovery work can be done. (For more information, refer to Japanese Patent Laid-Open No. 2002-91913).

Actually however it is difficult to correctly advice the maintenance location to be needed on a monitor screen in performance of the maintenance instruction.

SUMMARY OF THE INVENTION

The most important characteristic of the present invention is as follows. In a remote maintenance system, a image data of a facility monitored at site is sent to a monitoring center that is present in a remote location. In the center, the image data is provided with coordinates to form image coordinate data, and then the image coordinate data is compared with CAD coordinate data for CAD of the facility. So, the needed maintenance spot is located on the basis of a result of the comparison of those coordinate data, and the maintenance spot is known to the site with maintenance information.

According to the present invention, it is possible to correctly advice the needed maintenance location on a monitor screen from the remote location to the site, in performance of a maintenance instruction.

BRIEF DESCRIPTION OF THE DRAWINGS

FIG. 2 is an explanatory diagram showing an outline of a communication environment of a monitoring PC 5;

FIG. 3 is an explanatory diagram showing functions of a network bay 23;

FIG. 4 is an explanatory diagram showing a typical internal configuration of mobile equipment 12;

FIG. 5 is an explanatory diagram showing a typical internal configuration of a visual manual function 14;

DETAILED DESCRIPTION OF THE INVENTION

An embodiment of the present invention performs a system for providing an instruction to install or maintain a facility at a remote location by using mobile equipment or an IT technology directly to a work site.

Figure 1:
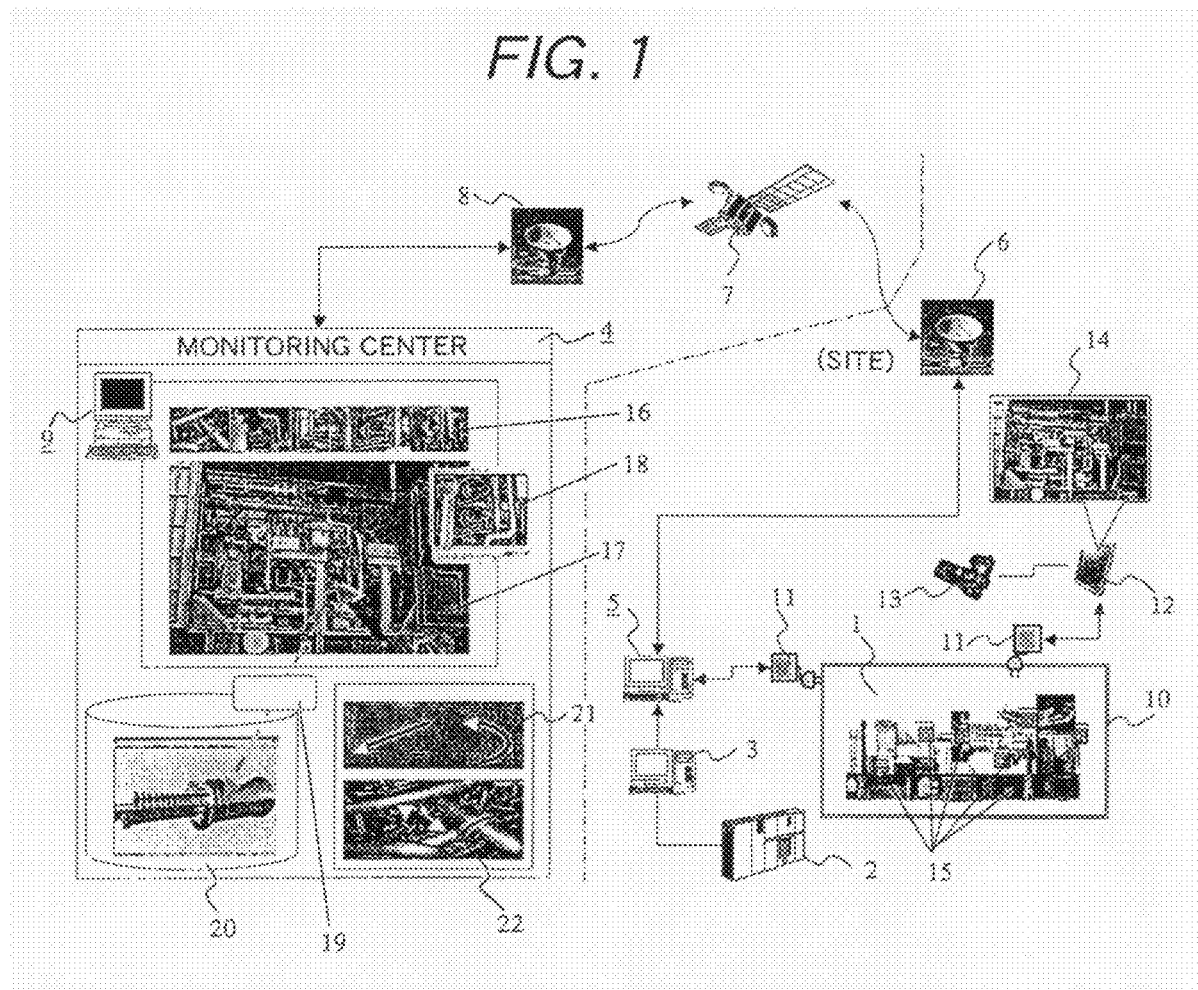
FIG. 1 is an explanatory diagram showing a typical application of the present invention to a gas turbine generator.

FIG. 1 is a diagram showing typical application of a remote maintenance system provided by the present invention for a gas turbine generator 1. The system comprises a monitoring PC (Personal computer) 5, a plurality of mobile equipment 12, an image-capture apparatus 13 and a center PC 9 (Personal computer). The monitoring PC 5 takes in input/output process value information and control signal information of an operation control apparatus of a facility serving as an object of inspection and maintenance. The operation control apparatus and the mobile equipment 12 compose a local network. The image-capture apparatus 13 can be connected to the mobile equipment 12. The center PC 9 is installed in a monitoring center 4 for monitoring information took in and held in the monitoring PC 5 through a pay station line 7.

Next, flows of information of operation control and information of maintenance in this embodiment will be explained by referring to FIG. 1.

Input/output information of a control apparatus 2 for controlling the gas turbine generator 1 is sent to the monitoring PC 5 via an external output terminal of an HMI (Human-Machine Interface) 3. The input/output information typically includes a process value for monitoring or control, a control digital signal or a trial-operation special measurement value.

After determining whether or not an input signal has a value outside a trend/warning range defined by a predetermined threshold value, the input signal is transmitted to the center PC 9 of the monitoring center 4 through the transmission/reception apparatus 6, the pay station line 7 and a transmission/reception apparatus 8.

On the other hand, a worker doing installation and maintenance jobs connects mobile equipment 12 to a communication modem 11, which is installed at each of a plurality of locations in a LAN 10 (Local Area Net work) set in advance. Each of the mobile equipment 12 includes a tag 15 with a read function (the read function will be described more as a function denoted by reference numeral 43 shown in FIG. 4). The mobile equipment 12 takes in information on the tag 15 installed at each of several locations in the gas turbine generator, by the read function of the tag 15 of the mobile equipment 12. The mobile equipment 12 is also connected to an image-capture apparatus 13. The capture apparatus is for recording and transferring image (picture) and ambient sound of the gas turbine generator 1. The mobile equipment 12 sends the information on the tag 15 to the monitoring PC 5 through the communication modem 11 and the LAN 10 along with the information (image data etc.) received from the image-capture apparatus 13. Then, the information on the tag 15 and the information received from the image-capture apparatus 13 are sent to the center PC 9 through the transmission/reception apparatus 6, the pay station line 7 and the transmission/reception apparatus 8. The information on the tag 15 and the information received from the image-capture apparatus 13 may also be stored in the mobile equipment 12.

In the center PC 9, a 3D-CAD matching function 19 matches received digital image data 16 with image data (CAD data) from a 3D digital image database 20. The matched image data is displayed on an image display screen. An image-requesting function 17 is capable of requesting the image display screen to obtain image data displayed on the screen as information necessary for maintenance. In addition, the image-requesting function 17 includes a real-time image display function 18 of a plant to be maintained. It is thus possible to issue a request for image data while checking on the progress of maintenance works. Further, the image-requesting function 17 also has a work-navigation-requesting function 21 and an image measurement function 22. The work-navigation-requesting function 21 includes information on procedures to disassemble and assemble each member of the maintained portion. The image measurement function 22 typically has a function capable of selecting and measuring a clearance between 2 pipes. The measurement can be carried out as a measurement of a ratio to a length used as a reference in the same image. Information (Data) obtained by execution of the various functions described above and information useful for doing jobs are displayed with overwriting on the screen of the image-requesting function 17. These information are sent to the mobile equipment 12 through the communication means explained earlier. The sent information allow the tag 15 to execute a function of updating information sent to the mobile equipment 12 at the time of when maintenance such as periodical inspection and repair is done. The above mentioned information (updated information) sent to the mobile equipment are inspections and a repair history. By executing such updating, it is possible to prevent inspections and examinations from being overlooked due to human errors.

When requesting the image display screen to obtain information necessary for maintenance, the image-requesting function 17 is capable of localizing places each having a dimension difference beyond a tolerance range set in advance, and obtaining the information necessary for maintenance. The information necessary for maintenance includes numerical data representing a wall-thickness decreased by oxidation in a wing of a gas turbine, a wall-thickness caused by wear in a shaft bearing, and a wall-thickness by high-temperature corrosion occurring in a high-temperature portion of a burner.

In addition, display functions of the mobile equipment 12, the monitoring PC 5 and the center PC 9 have functions for equating their display screens mutually, or functions allowing respective display information to be shared. Assume for example that information (cursor data) on a cursor of one of them (the mobile equipment 12, the monitoring PC 5 or the center PC 9) is varied. In this case, they (the mobile equipment 12, the monitoring PC 5 and the center PC 9) have a function that allows information (cursor data) on cursors of the others to be varied so that the cursors all move to the same coordinates.

Next, every component shown in FIG. 1 is explained in detail by referring to FIGS. 2 to 9.

FIG. 2 is a diagram showing a communication environment of the monitoring PC 5. An interface of the HMI (Human-Machine Interface) 3 transmits a signal of the control apparatus 2 to a network bay 23. In addition, a signal produced by the mobile equipment 12 is also sent to the network bay 23. The network bay 23 processes a variety of signals and sends a result of the processing to the monitoring PC 5. In the case of an installation or maintenance work, the monitoring PC 5 sends image data or voice data to the pay station line 7 through of a security apparatus 24. In the case of a trial operation work, on the other hand, the monitoring PC 5 sends an operation data signal to the pay station line 7 through a security apparatus 24. On the other hand, the monitoring center 4 sends a signal to the monitoring PC 5 through the security apparatus 24, after verifying that the signal is a signal sent by an authenticated sender. In accordance with an installation, maintenance or trial-operation work, the signal conveying information required is delivered to the mobile equipment 12 through the network bay 23.

In the case of the trial operation work described above, the monitoring PC 5 is also capable of sending voice data to the pay station line 7 through the security apparatus 24 in addition to the operation data signal.

FIG. 3 is a diagram showing functions of the network bay 23 shown in FIG. 2. Process data and control data are sent from the HMI (Human-Machine Interface) 3 to the data distributor 27 through a switch 25. In addition, image data, voice data and emails are transmitted from the mobile equipment 12 to the data distributor 27 through the switch 25. The switch 25 is provided with a work phase signal 26 to be a work phase (that is, an installation, maintenance or trial-operation work), by an external select function.

Thereby, in the case of a trial-operation work, the various data (the image data, voice data and emails) described above are sent the first diagnosis function 28. In the case of an installation or maintenance work, on the other hand, the data are sent to an image/voice/mail-history management function 31.

The first diagnosis function 28 is provided with a process/control-data recording apparatus 30 as an additional apparatus for storing data sent to the process/control-data-recording apparatus 30. On the basis of these data, the first diagnosis function 28 recognizes the soundness of the operating condition of a plant and a difference between each operation target value and an actually measured value corresponding to the target value. The operation target value is a value determined for a set condition that needs to be adjusted during a trial operation and determined for soundness of in object. On the basis of the recognized differences, the first diagnosis function 28 selects an item to be adjusted and sends the selected item to the security apparatus 24 after displaying the item on a display function 29. On the other hand, the image/voice/mail history management function 31 for recording image data, voice data and emails is provided with an image/voice/mail-recording apparatus 33 as an additional apparatus for actually storing input data comprising the image data, voice data and emails. The data received by the image/voice/mail history management function 31 is further sent on to a server function 32 to be eventually sent to the security apparatus 24.

FIG. 4 is a diagram showing the configuration of the mobile equipment 12. The voice-capture apparatus 34 is a unit provided to the mobile equipment 12 as an accessory unit of the image-capture apparatus 13 or a unit separated from the image-capture apparatus 13. Information (image data, voice data) from the image-capture apparatus 13 and the voice-capture apparatus 34 are stored in a storage 35. The data stored in the storage apparatus 35 is sent to an image-fitting function 38 and the monitoring PC 5.

In addition, memorandum information and/or a request information, which are received from an image-writing function 36, are sent to an image layer overwrite function 37 and a processing history update function 45. The data of the image layer overwrite function 37 is sent to the image-fitting function 38. And the data is incorporated in information from the image-capture apparatus 13. Thereby, information being overwritten on various kinds of information already appearing on the screen is displayed on the screen of a display function 39. At the same time, the data of the image layer overwrite function 37 is sent to the monitoring PC 5. The history information of the processing history update function 45 is sent to an tag fetch/overwrite function 43 to be described later.

The updating function of the tag 15 is a function for updating information stored in the tag 15 itself into information sent to the mobile equipment 12. For example, when a maintenance worker having the mobile terminal approaches the tag during a periodical maintenance of repair work and requests the mobile terminal to update identified information, the tag receives the information sent from the mobile terminal and uses the information for updating existing information. As an alternative, the received information is added to the existing information on a history of inspections or repairs in order to update the existing information.

As for an electronic-mail information, after its creation by using a mail-writing function 40, the mail is sent to a mail-saving function 41. A mail sent from the monitoring center 4 is stored to the mail-saving function 41 through the monitoring PC 5. The mail received from the monitoring center 4 can be displayed on a display function 39 if necessary.

In addition, a work instruction signal from the monitoring center 4 makes a request for an output of a visual manual database 42 through the monitoring PC 5. The output signal is selected by adoption of a method described as follows. That is, the output signal is transfer to the manual marker function 44, after the tag fetch/overwrite function 43 fetches plant information from the tag 15. Examples of the plant information from the tag 15 are information on an installation location of the tag 15 and information on a member of interest or a work history. The manual marker function 44 selects information necessary for the work from those stored in the visual manual database 42 and retrieves the selected information from the visual manual database 42. The retrieved information is then displayed on the display function 39.

FIG. 5 is a diagram showing a content select function of the visual manual function 14. A select signal 46 indicating a work phase drives a select function 47 to select information from one of a installation database 48, a trial-operation database 49 and a maintenance database 50, which have been prepared in advance. As described earlier, the work phase is the installation, the maintenance or the trial operation. Typically, a manual input or a work-phase signal 26 of the network bay 23 can be used as the select signal 46.

The output of the select function 47 is sent to the screen select function 51. The screen select function 51 is capable of selecting a signal to be output to the display function 39 in accordance with signals of an external select function 52 and the manual guide function 44, which are used for manual selection.

In accordance with information from the control apparatus 2, a diagnosis function included in the monitoring PC 5 identifies member (part; component) causing a problem. A process measuring signal, namely a signal representing a result of measuring a process condition of a generator being inspected, indicates a trend of the process condition of the monitored object. Therefore, the diagnosis function can identify the member having is problem of the object by monitoring trend of the process measuring signal. For example, if the temperature of a high-temperature member metal is increasing along with the temperature of exhausted gas, it is highly possible that a combustion abnormality is being occurred; in addition to that, if the temperature or pressure of a compressor exist is normal, that it is highly possible that a problem has been raised in the nozzle of a burner or the combustion system. These trends are can be known by the measuring process signal. In this case, the diagnosis function makes such trends known, and indicates the inspection method for problems and its routine. The diagnosis function searches for instruction to cope with the problems. For example, checking control logic set value of a fuel control valve and a control apparatus; and a checking of an internal cylinder of the burner, a transition piece, an expansion turbine nozzle or a basket, and the instruction and method of the checking, are searched for from a storage and they are displayed. Examples of the member in object are. The center PC 9 also has a diagnosis function for carrying out the same diagnosis. If a more detailed study is required, design engineers and/or quality assurance engineers can evaluate data in order to directly issue a instruction by transmitting a result of the evaluation through the use of an email function added to the center PC 9.

Typical contents of databases are explained as follows.

Figure 6:
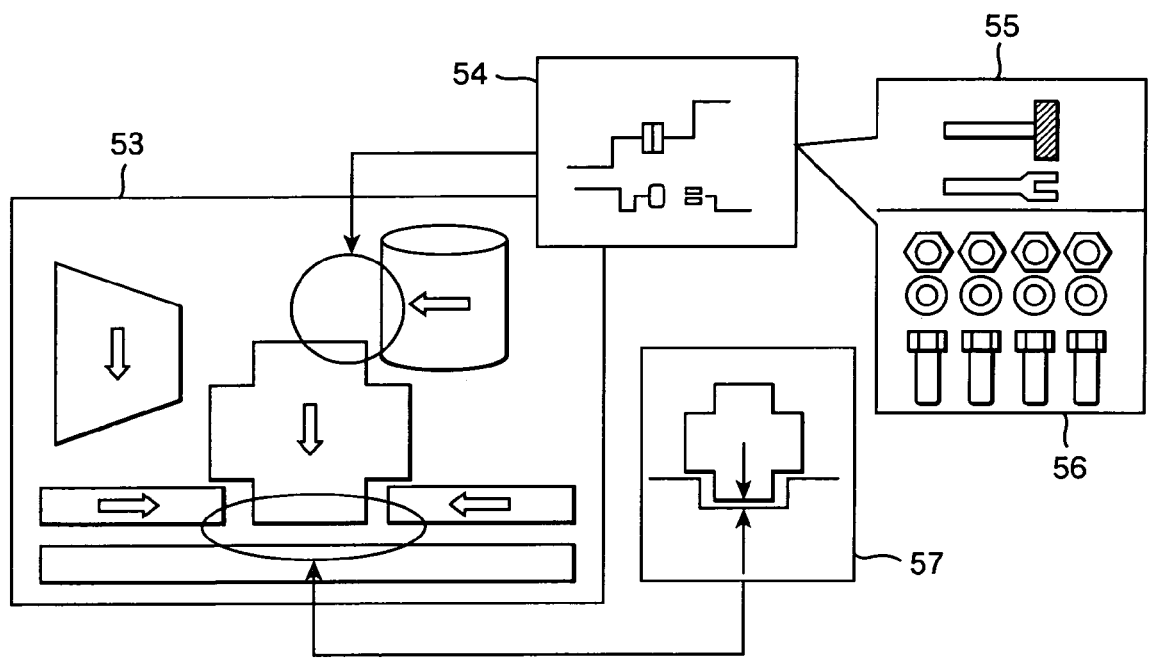
FIG. 6 is an explanatory diagram showing a typical internal configuration of an installation database 48.

FIG. 6 is a diagram showing a typical configuration of a manual for an installation database 48. A first screen shows a moving picture of an installation procedure 53 of a member in the object or an expansion diagram. If an installation portion of one of elements shown in the expansion diagram is selected, a connection procedure 54 of piping or wiring is displayed. In addition, a variety of usage fittings and tools 55 such as one M10 spanner and one hammer is shown. In addition, a variety of usage components and tools 56 is also displayed as well. A displayed example of the components and tools 56 is 4 component/tool sets each including an M10 bolt, a washer and a nut. Moreover, clearance/control numerical values 57 such as a shift and a clearance, which serve as a determination criteria indicating completion of an assembly, are also displayed.

The pieces of information are displayed on the basis of work priority levels. For example, a high priority level is assigned to the large number of installation man-hours, and to an installation work requiring cautions without regard to whether the number of installation man-hours is small or large. In addition, numbers are displayed in turn for avoiding a repeat operation such as a removal of a member after an installation of the component. If an incorrect member or a wrong operation has been selected, a warning message is presented. As an alternative, an incorrect member or a wrong operation is not displayed from the beginning to avoid such a selection mistake.

Figure 7:
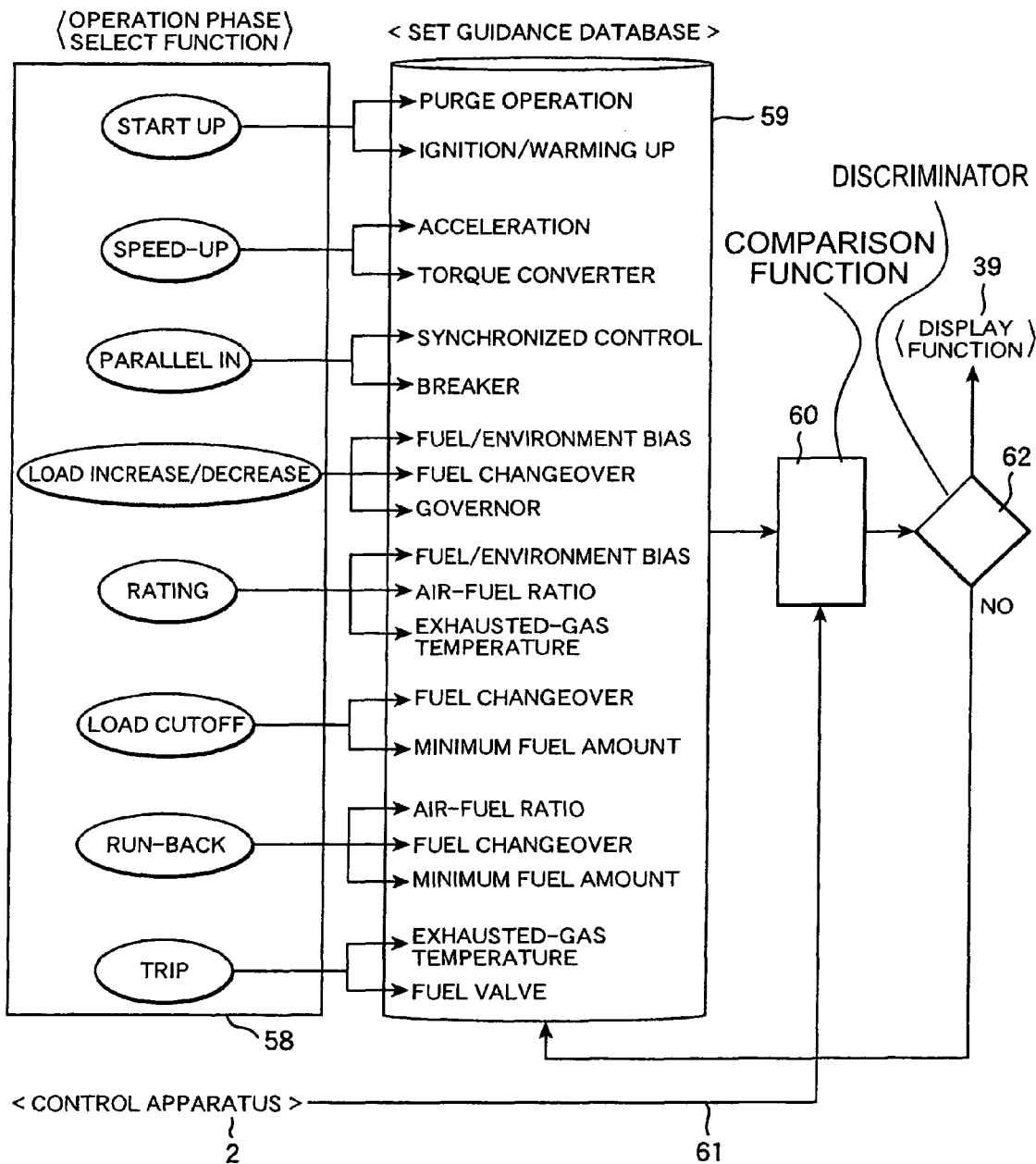
FIG. 7 is an explanatory diagram showing a typical internal configuration of a trial-operation database 49.

FIG. 7 is a diagram showing a typical configuration of a manual for a trial-operation database 49. First of all, an operation-phase select function 58 is used for setting typically starting up, rotational speed up, generator parallel in, load up, load down, rated load, load cutoff, run-back abruptly decreasing the load or a trip of an instantaneous loss of the load. The setting signal is sent to a setting guidance database 59. The setting guidance database 59 outputs adjustment-guiding information of a hardware-setting value such as a control-setting value or a fuel valve servo gain to a comparison function 60 for each operation phase. Typical setting items for the operations phases are explained as follows.

In the case of the starting up, the setting signal represents a purge operation to exhaust residual gas remaining in gas routes in the plant to the outside of the plant, and a warming up adjustment or an ignition adjustment for warming apparatus in order to reduce a thermal load after injection of fuel and the ignition.

In the case of the speed-up, the setting signal represents a rotational acceleration adjustment to avoid resonance of a rotor or surging of a compressor after starting up, and an adjustment of a setting value of a torque converter for adjustmentling the rotational speed of an electric motor or a motive power till a turbine reaches a self-operation state.

In the case of the parallel in, the setting signal represents a synchronized adjustment of matching speed for synchronization with a power system after the rotational speed reaches a target, and a switch adjustment of a breaker at the same time as the synchronization.

In the case of the load up or the load down, the setting signal represents a bias adjustment such as fuel or an atmospheric condition to achieve a stable operation while increasing and decreasing the amount of fuel, and a fuel-switching timing adjustment and a gas-burner setting for controlling the rotational speed.

In the case of the rated load, the setting signal represents a bias adjustment such as fuel or an atmospheric condition, an adjustment of a ratio of an air mass to a fuel mass as a ratio controlling stability of combustion and a line adjustment of exhausted-gas temperature adjustment, which is based on the exhausted-gas temperature and adopted as recommended adjustment of the combustion temperature.

In the case of the load cutoff, the setting signal represents a fuel changeover adjustment for stabilizing a flame for fuel narrowed down abruptly or an adjustment of a minimum fuel amount serving as a flame-failure limit.

In the case of the run-back, the setting signal represents an adjustment of an air-fuel ratio for maintaining stability of combustion in a process to abruptly reduce a load and the aforementioned adjustment of a minimum fuel amount.

In the case of the trip, the setting signal represents an adjustment of a fuel valve to suppress a rotational-speed increase accompanying an abrupt decrease in load, an adjustment of the temperature of exhausted gas in order to suppress an abrupt increase in exhausted-gas temperature (or an abrupt increase in combustion temperature) due to an excessively large amount of introduced fuel according to the magnitude of the load or another adjustment.

The control apparatus 2 supplies a process-value measurement signal to the comparison function 60, which outputs a comparison signal to a discriminator 62. If a difference from any one of numerical values set in advance is large, the processing is returned to the setting guidance database 59 to repeat the adjustment of the setting value. If the difference falls within a range of tolerance, on the other hand, the display function displays a result of the adjustments.

In addition, if the trial-operation support is selected, an operation to record voice data in the mobile equipment 12 is set automatically so that voice data representing a situation at the onsite is recorded.

Figure 8:
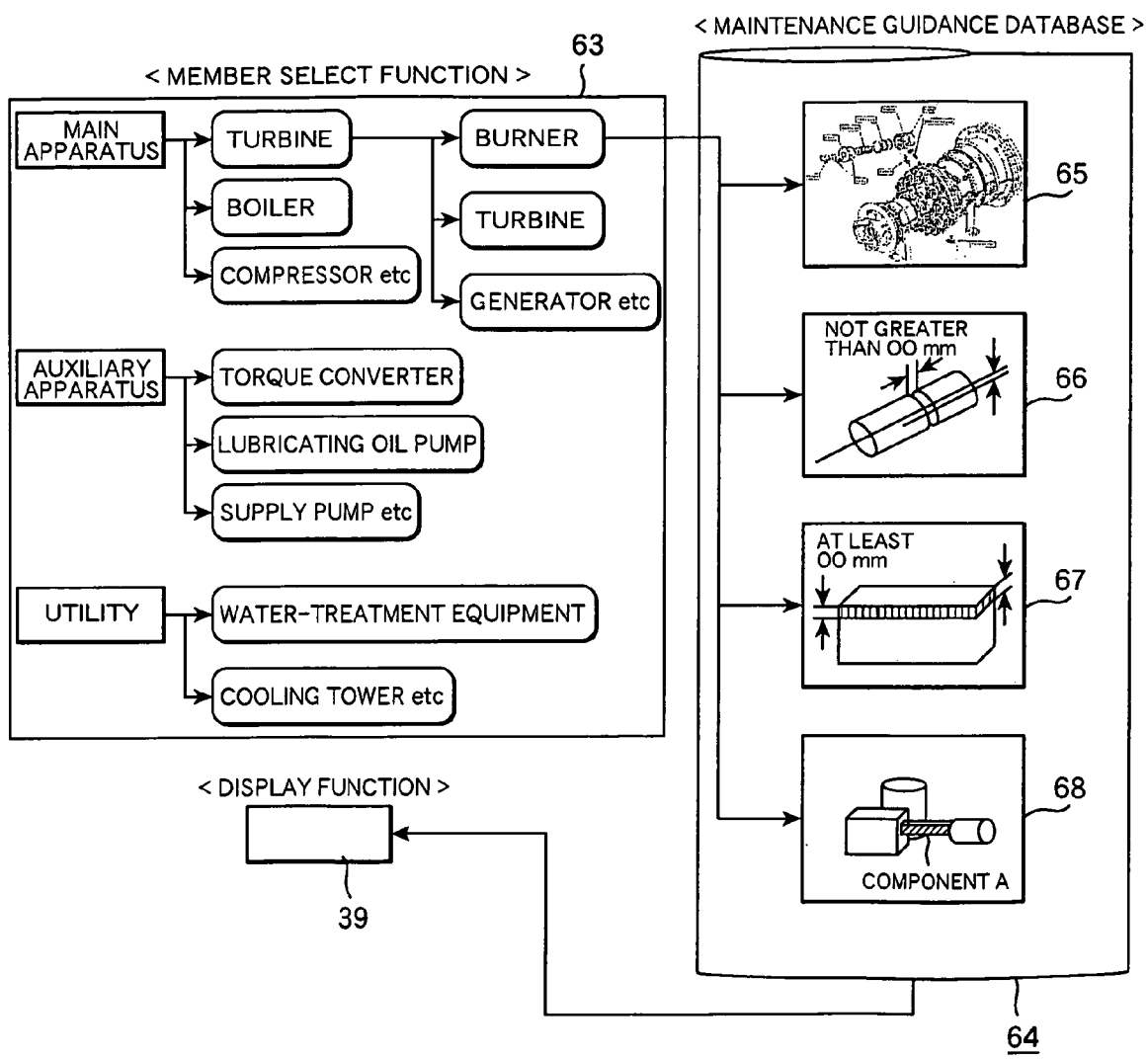
FIG. 8 is an explanatory diagram showing a typical internal configuration of a maintenance database 50.

FIG. 8 is a diagram showing a typical configuration of a manual for the maintenance database 50. First of all, a member select function 63 selects a member to be maintained. Typically, members can be classified into large categories, i.e., main apparatus, auxiliary apparatus and utility apparatus. The main apparatus, auxiliary apparatus and utility apparatus can each be further classified into medium categories. That is to say, examples of the main apparatus are a turbine, a boiler and a generator. Examples of the auxiliary apparatus are a torque converter, a lubrication oil pump and a water supply pump. Examples of the utility apparatus are a water-processing apparatus and a cooling tower. The apparatus can also be classified into smaller categories such as a burner, a turbine and a compressor. As an example, the figure shows flows in main apparatus, which are a turbine and a burner in this case. Information is sent from the member select function 63 to a maintenance guidance database 64. The maintenance guidance database 64 includes a disassembly/assembly database 65, assembly-time clearance/tolerance deviation control values 66, component-replacement criteria 67 and a component-replacement request 68. The disassembly/assembly database 65 includes information on the name and location of every member as well as information on configuration elements or the like. The assembly-time clearance/tolerance deviation control values 66 include tolerances and clearances. The tolerances and clearances each serve as a reference taken in a process to assemble each of members. The component-replacement criteria 67 include information indicating a usage limit of each of deteriorated and/or damaged states. The component-replacement request 68 includes information indicating actual members to be replaced. Information selected from those stored in the maintenance guidance database 64 is displayed on the display function 39.

Figure 9:
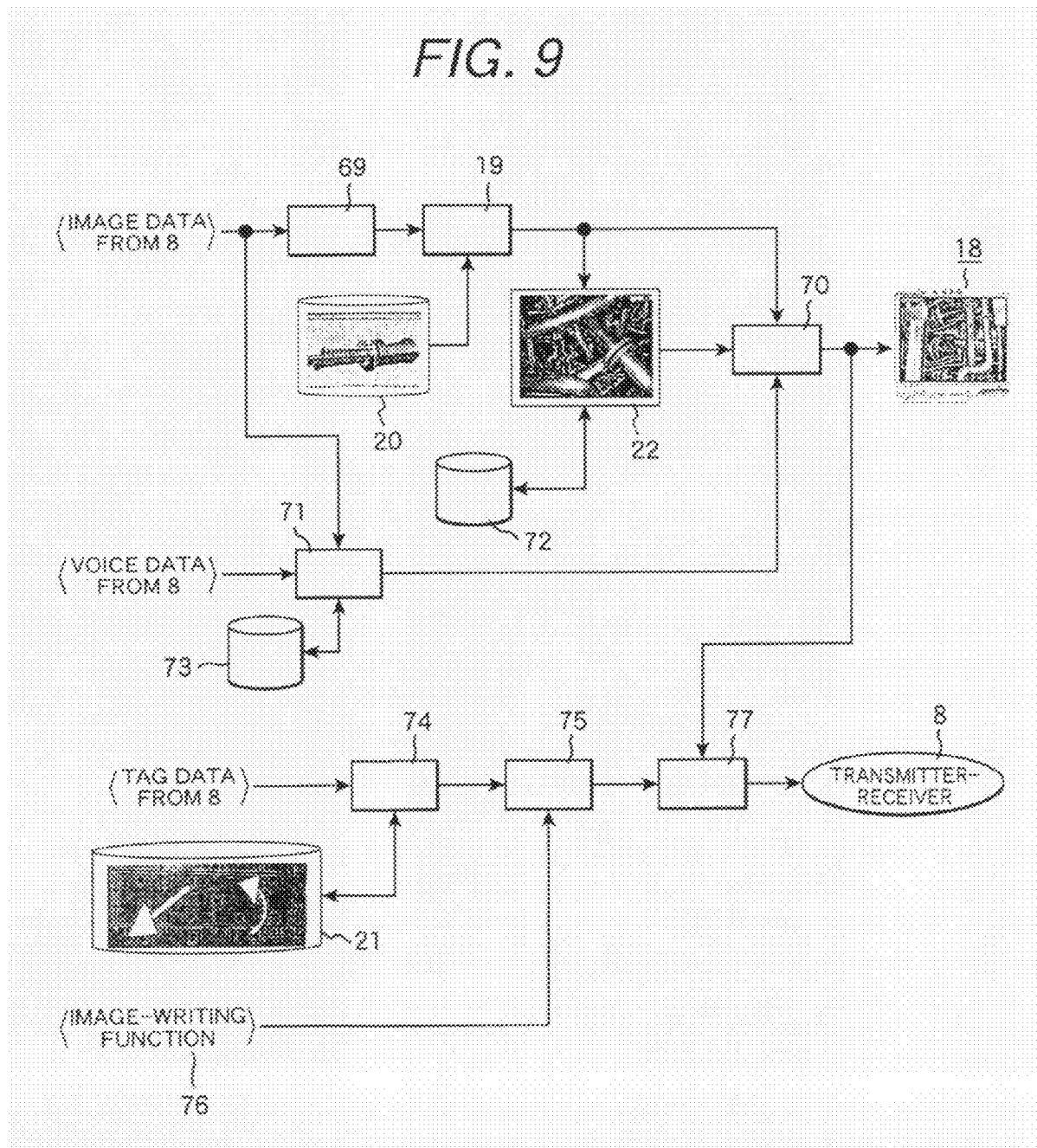
FIG. 9 is an explanatory diagram showing a typical internal configuration of a center PC 9.

FIG. 9 is a diagram showing a typical internal configuration of the center PC 9. Image and voice data from the transmission/reception apparatus 8 is sent to an image combination function 69 and a real-time communication function 71. The output of the image combination function 69 is sent to the 3D-CAD matching function 19.

The 3D-CAD matching function 19 is provided with the 3D digital image database 20 mentioned earlier as an additional database. After verifying that data from the 3D digital image database 20 is matches with information (image data) from the image combination function 69, the data is sent to the image measurement function 22 and a signal-switching function 70. The image combination function 69 includes a function for superposing pieces of image data obtained as a result of taking images in a plurality of directions for a member of interest in order to set virtual coordinates on 3D coordinates to image end faces so as to add and combine attributes of lines, faces or corners. The 3D-CAD matching function 19 includes a function for superposing information (image data) of the member on portions in the same coordinates from the image combination function 69 on the basis of reference coordinates or line, face or corner information from data recorded in the 3D digital image database 20 in advance.

The image measurement function 22 is a function for measuring dimensions of the member appearing on a display screen and outputting a result of the measurement to a measurement-data saving/management function 72 and the signal-switching function 70. On the other hand, the voice data is sent to the real-time communication function 71 along with the image data, and the real-time communication function 71 passes on the data to the signal-switching function 70.

The signal-switching function 70 sends the data to the real-time image display function 18 and a transmitted-information process function 77.

The real-time image display function 18 displays information (real-time image data) selected by the signal-switching function 70. For example, if information output by the 3D-CAD matching function 19 is selected, a images combined with 3D-CAD data already prepared is displayed in order to indicate differences between an actual site screen and design information as well as component attributes. If information output by the image measurement function 22 is selected, information from the measurement-data saving/management function 72 is displayed to show positional information attributes of an actual apparatus installed at the site. If information output by the real-time communication function 71 is selected, the present situation of the site can be verified. The real-time communication function 71 is capable of carrying out not only communications in one direction, but also communications in two directions. The real-time communication function 71 also enables a network meeting allowing information to be shared by the monitoring center 4 and the site in the object.

In addition, at a trial-operation time, the voice data representing the condition of the site is automatically received. If a voice having a frequency different from voice data stored in the measurement-data saving/management function 72 as voice data representing a normal condition of the site is generated, a warning is automatically issued.

The transmitted-information process function 77 sends data displayed on the real-time image display function 18 to the monitoring PC 5 of the mobile equipment 12 through the transmission/reception apparatus 8. An image of a facility being monitored is combined with CAD data, and an image data obtained as a result of the combination is sent in order to issue a proper instruction to a worker by indicating a difference from design information to the worker.

In addition, the tag data is sent to a work select function 74 and information from the work-navigation-requesting function 21 set in advance is selected or retrieved to be transmitted to a data attachment function 75.

An image-writing function 76 is added to the data attachment function 75 as a function for writing information necessary for the work over existing information. The data attachment function 75 sends only positional data of the information on a screen to the transmitted-information process function 77. The transmitted-information process function 77 sends work-supporting information to the site being maintained through the transmission/reception apparatus 8.

It is to be noted that, in addition to information from the work-navigation-requesting function 21, maintenance information necessary for the work can also be retrieved as information to be sent by using the tag information. The maintenance information necessary for the work includes information from the image measurement function 22. The information can be retrieved by associating the information in advance or associating the information by using typically information on a monitored portion.

Figure 10:
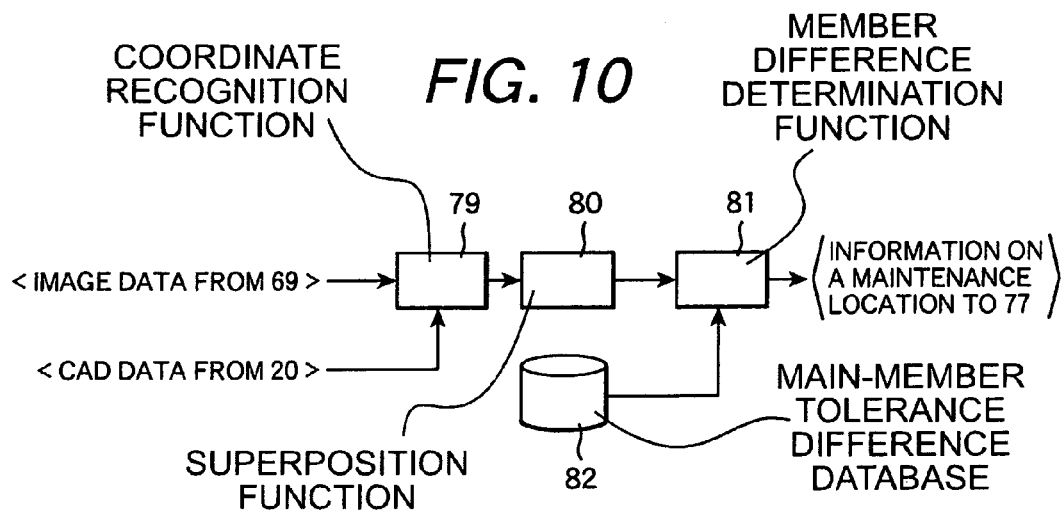
FIG. 10 is an explanatory diagram showing a typical internal configuration of a 3D-CAD matching function 19.

FIG. 10 is a diagram showing a typical internal configuration of the 3D-CAD matching function 19. The image data sent by the image combination function 69 and the CAD data sent by the 3D digital image database 20 are matched by a coordinate recognition function 79 so that they coincide with each other on the same coordinates. After the matching process, a superposition function 80 superposes those images. The superposition function 80 receives data representing a photographing direction, a photographing distance and a photographing contraction as information on a photographing method adopted by the image-capture apparatus 13. The superposition function 80 makes photographing-point coordinates coincide with coordinates in a virtual space in the 3D digital image database 20 in order to carry out a superposition process on a surface of a member of interest on the 3D-CAD. The superposed information is then sent to a member difference determination function 81. The member difference determination function 81 also receives information from a main-member tolerance difference database 82 at the same time. The member difference determination function 81 sends information on a member determined as a member to be subjected to a maintenance work to the transmitted-information process function 77 as information with a difference going beyond a range of tolerance.

Figure 11:
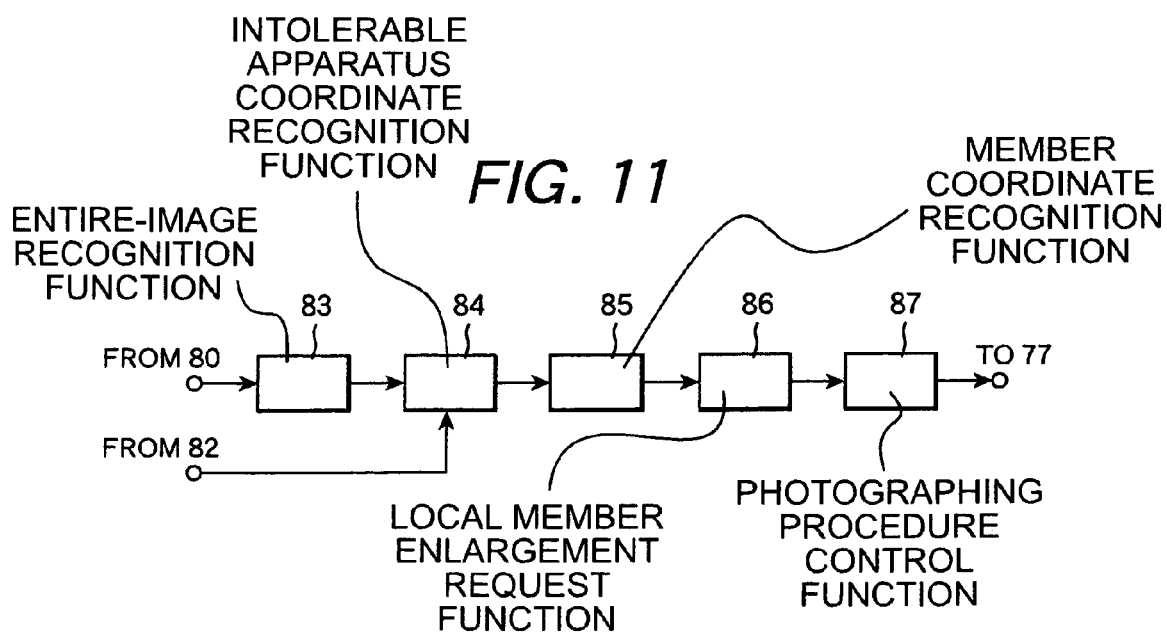
FIG. 11 is an explanatory diagram showing a typical internal configuration of a member difference determination function 81.

FIG. 11 is a diagram showing a typical internal configuration of the member difference determination function 81. An entire-image recognition function 83 for recognizing an image of the entire object to be maintained receives information from the superposition function 80. In the case of a gas turbine generator, for example, the entire-image recognition function 83 creates 3D data by superposing 3D-CAD data as the whole of the gas turbine and its real image data, and the superposed image data 3D is sent to a function 84 for recognizing whether the image data (object) 3D is beyond a tolerable coordinate. The function 84 also receives information from the main-member tolerance difference database 82. On the basis of the 3D data and the information received from the main-member tolerance difference database 82, the intolerable apparatus coordinate recognition function 84 recognizes a member whose appearance change value representing a deterioration and/or a deformation exceeds a tolerance value, and sets the recognized member on the 3D data. A signal output by the intolerable apparatus coordinate recognition function 84 is sent to a member coordinate recognition function 85. The member coordinate recognition function 85 generates a signal representing the member and supplies the generated signal to a local member enlargement request function 86. The local member enlargement request function 86 generates information of the member enlarged on the image and supplies the generated information to a photographing procedure control function 87. If the image-capture apparatus 13 includes a photographing-direction adjustment apparatus, the photographing procedure control function 87 supplies a direction-instruction control signal of the apparatus to the transmitted-information process function 77. If the image-capture apparatus 13 includes no photographing-direction adjustment apparatus, on the other hand, the photographing procedure control function 87 supplies a signal indicating a method of photographing the member on the screen of the mobile equipment 12 to the transmitted-information process function 77.

Figure 12:
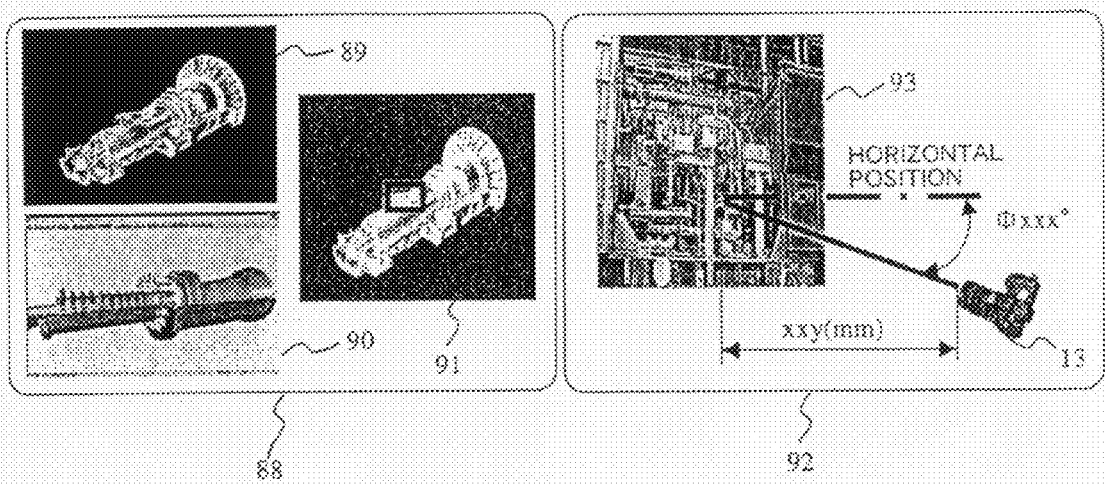
FIG. 12 is an explanatory diagram showing a typical structure of information output by the member difference determination function 81.

FIG. 12 is a diagram showing typical information output by the member difference determination function 81. On an all apparatus display function 88 serving as a first typical screen, an all object apparatus image display function 89 and an object apparatus CAD display function 90 are displayed. In addition, the all apparatus display function 88 also displays an image/CAD combination display function including difference position disclosure information 91 obtained as a result of superposition of the all object apparatus image display function 89 and the object apparatus CAD display function 90. The image/CAD combination display function including difference position disclosure information 91 emphasizes differences between the all object apparatus image display function 89 and the object apparatus CAD display function 90. On a local image photographing control information disclosure function 92 serving as a second typical screen, on the other hand, a determined-member enlarged-image display function 93 representing a signal output by the local member enlargement request function 86 is displayed. The determined-member enlarged-image display function 93 is information on a photographing procedure adopted by the image-capture apparatus 13. An example of the information is a photographing position represented by an angle φ of XXX degrees from a horizontal-line reference passing through the member and a horizontal distance of XXY mm. If the image-capture apparatus 13 includes an adjustment function, for example, a control signal is sent. The control signal conveys information such as a horizontal direction of α degrees, a vertical direction of β degrees and a focus of γ.

Figure 13:
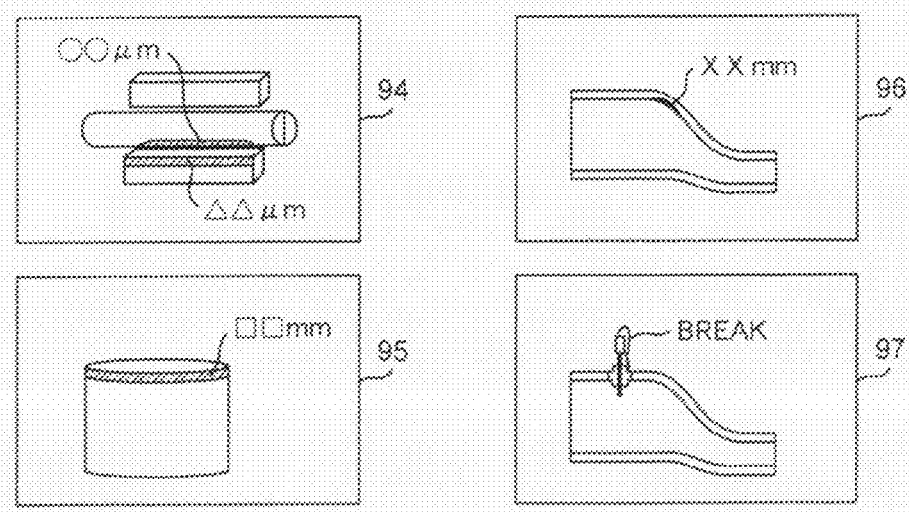
FIG. 13 is an explanatory diagram showing a typical internal configuration of a main-member tolerance difference database 82.

FIG. 13 is a diagram showing a typical structure of the main-member tolerance difference database 82. Typically, a shaft-bearing tolerance wear thickness 94 has a function for indicating a shaft-bearing-side wear tolerance value of any rotational shaft bearing and a rotational-shaft-side wear tolerance value. A wing tolerance reduced-wall thickness 95 typically has a function for indicating an oxidation wall reduction tolerance value for a wall reduction caused by high-temperature gas that can be generated with ease at a wing end in a turbine. Typically, a transition peace tolerance damage thickness 96 for introducing gas-turbine burned gas to a turbine has a function for indicating a damage tolerance value of a damage caused by burned gas. A sensor broken wire 97 typically includes information on layouts of all signal wires of a temperature or a pressure sensor as CAD data. On the basis of these pieces of information, the member difference determination function 81 selects a member that needs to be repaired or replaced, and the member difference determination function 81 is thus capable of including information on the selected member in information to be transmitted to the center PC 9.

Figure 14:
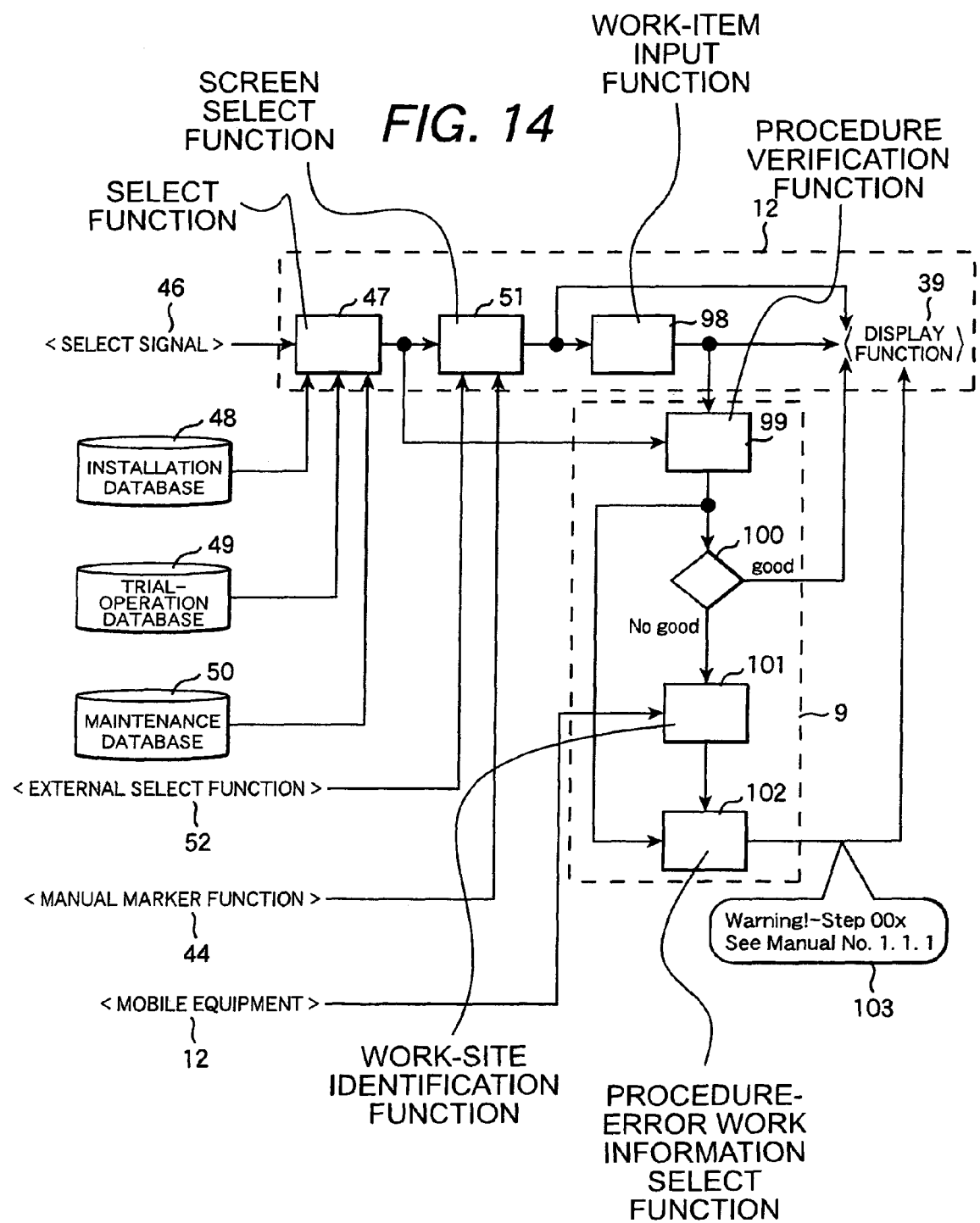
FIG. 14 is an explanatory diagram showing a typical internal configuration of a visual manual function 14.

FIG. 14 is a diagram showing a typical internal configuration of the visual manual function 14 and a procedure-error-providing function. Every database can be provided on the center side, the facility side or both the sides. The mobile equipment 12 comprises the select function 47, the screen select function 51, a work-item input function 98 and the display function 39. The center PC 9 comprises a procedure verification function 99, a determiner 100, a work-site identification function 101 and a procedure-error work information select function 102. There are a plurality of embodiments in which the work-item input function 98 receives information from the mobile equipment 12, the center PC 9 and the monitoring PC 5.

A select signal 46 indicating a work phase (which can be an installation work, a maintenance work or a trial-operation work) selects information from the installation database 48, the trial-operation database 49 and the maintenance database 50, which have been prepared in advance, as the output of the select function 47.

The output of the select function 47 is sent to the screen select function 51 and the procedure verification function 99. Information output by the screen select function 51 is sent to the work-item input function 98 and the display function 39. With the work-item input function 98, a person actually doing works or a supervisor verifies a work process along a work item before supplying the process to the mobile equipment 12. The work-item input function 98 is provided in the center PC 9. In some cases, the work-item input function 98 has a function for verifying an operation carried out by a person doing works on the basis of information output by the image-capture apparatus 13 before inputting the verified information. More details will be explained later by referring to FIG. 15.

Information output by the work-item input function 98 is sent to the procedure verification function 99. The procedure verification function 99 also receives information output by the select function 47. The procedure verification function 99 collates the information output by the work-item input function 98 with the information output by the select function 47 to compare the progress of the actual work with a procedure described in a manual and supplies a result of the collation to the determiner 100. If the result of the collation indicates that the work has been carried forward in progress according to the manual procedure, the determiner 100 produces a 'good' result of determination. In this case, the determiner 100 supplies confirmation information to the display function 39. If the result of the collation indicates that the work was not carried forward in accordance with the procedure of the manual or the work has given an improper work result, on the other hand, the determiner 100 produces a 'no good' result of determination. In this case, the determiner 100 informs a work-site identification function 101 of the result of determination. The progress of the actual work is compared with the procedure described in the manual by comparing a work item of the manual with a recognition signal representing the work item in the center PC 9 receiving the recognition signal transmitted on the basis of an input received from the mobile equipment 12 as an input indicating completion of the work item. In the case of a continuous work procedure, agreement with a reception order is examined. If the recognition signal of the work item has been received not in accordance with the procedure described in the manual, no agreement with the reception order is determined. Since the comparison process is carried out at a remote location, time information can be attached to a recognition signal transmitted by the mobile equipment 12 as the recognition signal representing the work item in order to enhance the precision of the comparison process.

The work-site identification function 101 also receives the address of the mobile equipment 12. The address is used as information for identifying the mobile equipment 12 serving as the source of the received information. A signal output by the work-site identification function 101 is sent to a procedure-error work information select function 102. If only one mobile equipment 12 is used, that is, if a plurality of mobile equipment 12 are not used, the work-site identification function 101 can be eliminated. There are a plurality of methods for determining a work site. In accordance with one of the methods for determining a work site, received data with an error retrieved by the procedure-error work information select function 102 as will be described later is assumed to be data transmitted from a site with the error retrieved, and the address of the received data is identified. In accordance with another one of the methods for determining a work site, work-site data is provided as data associating the address of every mobile equipment 12 with a work site and a work site is retrieved from a result produced by the procedure-error work information select function 102 as will be described later to be used for identifying an address recorded in the work-site data as an address of the mobile equipment 12 associated with the work site.

The procedure-error work information select function 102 also receives the information from the procedure verification function 99 as information used for selecting a problem generation item generating a problem in the course of a work step. The procedure-error work information select function 102 supplies the selected item to the display function 39. The information sent to the display function 39 typically includes a warning (Warning!), a problem generation step (Step 00x) and error recovery information (See Manual No. 1.1.1) as shown in typical procedure error information 103 of the figure.

The procedure error information is information used for a process of recovery from a procedure error. A manual showing a procedure for a process of recovery from an error as a procedure different from a work manual procedure is prepared in a separate database. By transmitting the error recovery information along with error information, an error procedure and an error location can be identified so that the person doing a work generating the procedure error can be provided with a work procedure for a process of recovery from the error. In addition, a plurality of pieces of error recovery information can be selected. One of the pieces of error recovery information is error recovery information prepared in advance for a manual procedure causing a procedure error. Another one of the pieces of error recovery information is error recovery information prepared in advance for a procedure, which was transmitted from the mobile equipment 12 when a procedure error was generated.

Upon a request for a display of the error recovery information on the display function 39, the error recovery information is displayed manually or automatically and an input of a return work item is accepted by the work-item input function 98. Then, the procedure verification function 99 verifies a procedure of the error recovery procedure and an input procedure. The processes are repeated till the determiner 100 produces a 'good' result of determination. Assume for example that, for a work to be carried out in the order of steps A→B→C→D, the work is actually carried out in the order of steps A→B→D. In this case, the determiner 100 produces a 'no good' result of determination and the procedure error information 103 shows Manual No. 1.1.2. In accordance with Manual No. 1.1.2, the flow of the procedure shall go back to immediately preceding step B and a work shall be carried out to restore the result of a job done at step D. The procedure error information 103 shows a correct work and, if the determiner 100 produces a 'good' result of determination this time, the work-item input function 98 enters a state of waiting for an input of an order of steps C→D since the flow of the procedure has gone back to step B.

By the same token, the mobile equipment 12 comprises the display function 39 and the work-item input function 98. The display function 39 is a means for showing manual work data of a database. On the other hand, the work-item input function 98 is a function for inputting work condition data showing the condition of a work done by a worker. The monitoring PC 5 comprises a reception means for receiving work condition data from one of mobile equipment and a transmission means for transmitting the work condition data to a computer employed in the monitoring center. The center PC 9 is performed as a monitoring system in order to simplify an operation to make a request for a procedure error. The monitoring system comprises the procedure verification function 99, the work-site identification function 101 and a transmission means. The procedure verification function 99 is a function for comparing work condition data input from one of a plurality of mobile equipment with manual-work data of a database. The work-site identification function 101 is a function for identifying a specific mobile equipment corresponding to a work site represented by the mismatching work condition data in case a comparison result produced by the procedure verification function 99 indicates that the pieces of work condition data do not match each other. The transmission means is a means for transmitting procedure error information to the specific mobile equipment in case the comparison result produced by the procedure verification function 99 indicates that the pieces of work condition data do not match each other. In addition, if there are a plurality of mobile equipment and the comparison result produced by the procedure verification means indicates that the pieces of work condition data do not match each other, by identifying a specific mobile equipment corresponding to a work site represented by the mismatching work condition data, the computer employed in the monitoring center is capable of presenting necessary information to a the party requiring that a request for a procedure is made in a work site of a broad range. In addition, since the procedure is not input by a supervisor supervising the work, there is no need for grasping the entire work so that it is possible to eliminate an error caused by a supervision leak.

Figure 15:
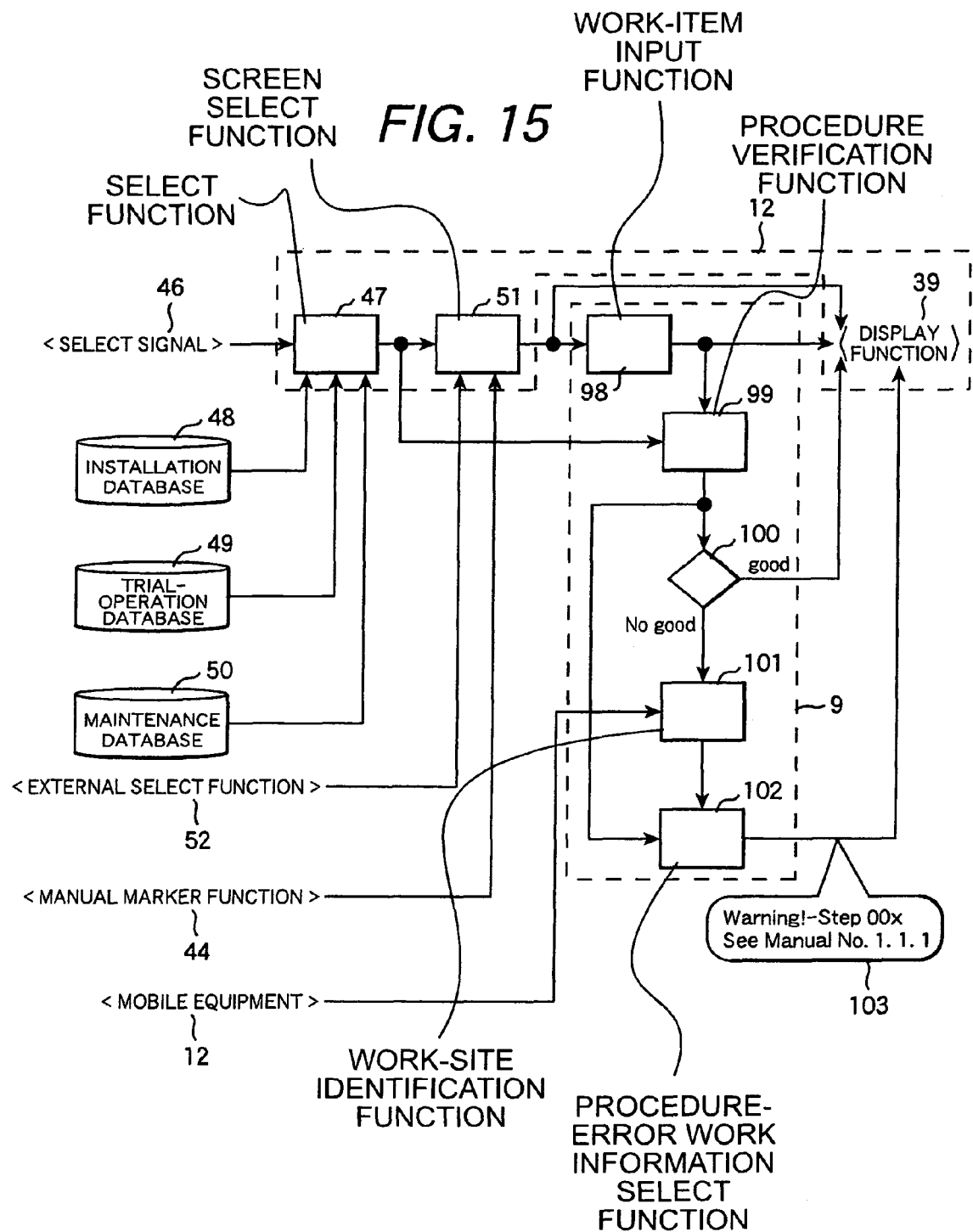
FIG. 15 is an explanatory diagram showing a configuration in which the center PC 9 has a work-item input function 98.

FIG. 15 is a diagram showing a typical internal configuration of a system in which the center PC 9 has the work-item input function 98. Explanation of elements shown in the figure as elements identical with those shown in FIG. 14 is omitted. In the system, each of a plurality of mobile equipment 12 includes the display function 39 for displaying manual work data of a database. The monitoring PC 5 has the image-capture apparatus 13 for fetching an image of a facility being monitored. The image-capture apparatus 13 transmits the fetched image to the center PC 9. The center PC 9 comprises a means for receiving an image from the image-capture apparatus 13 and the work-item input function 98 for inputting work condition data representing the condition of a work done by a worker.

The image received from the image-capture apparatus 13 is examined to verify an operation carried out by a worker on the facility side. Work condition data entered by a worker on the center side is accepted by the work-item input function 98. As such, since there is no need for entering work condition data from mobile equipment 12 at the site, it is possible to get rid of a procedure error caused by an input mistake made by the worker working at the site and possible to present necessary information to a the party requiring that a request for a procedure be made at a work site of a broad range.

Figure 16:
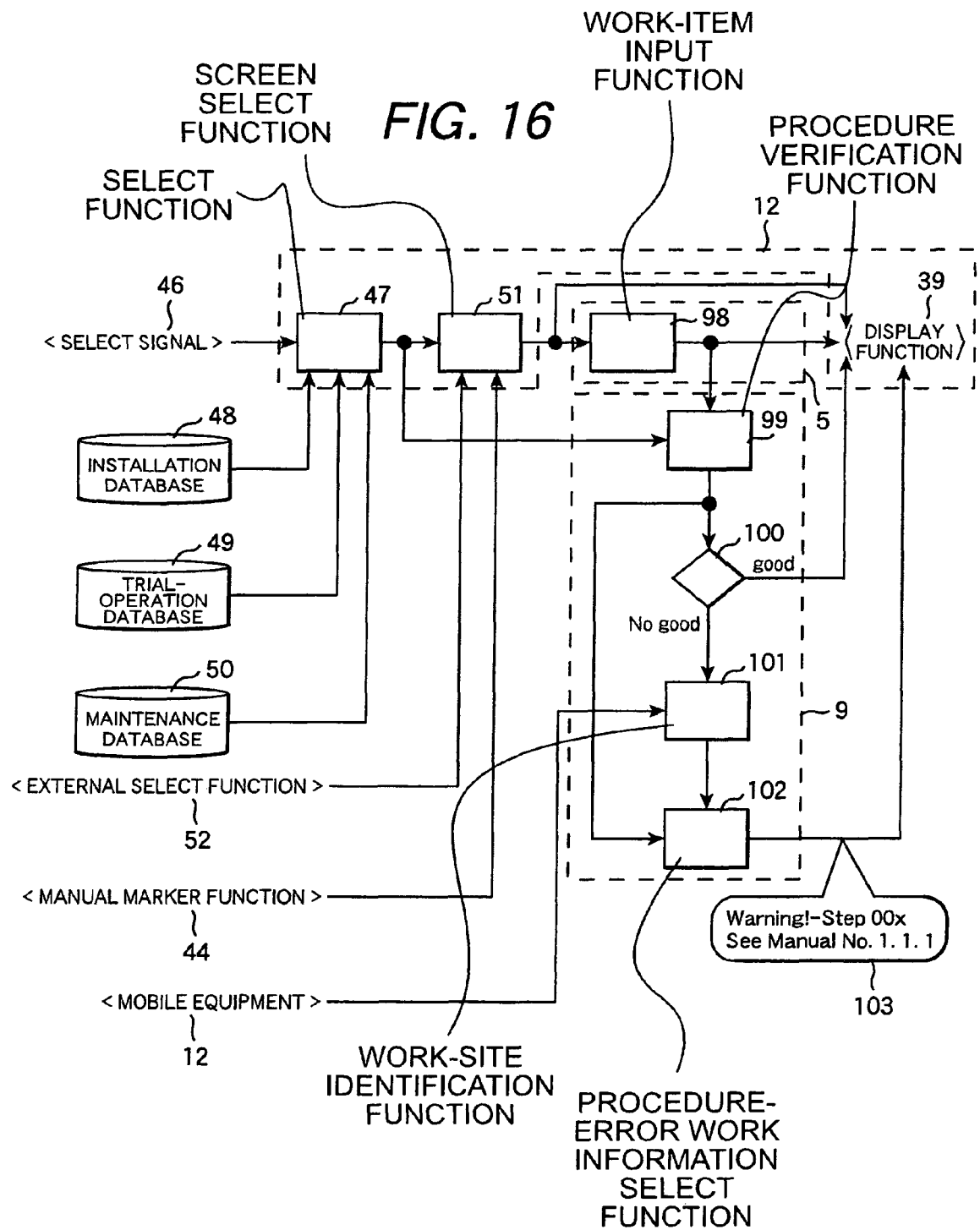
FIG. 16 is an explanatory diagram showing a configuration in which the monitoring PC 5 has the work-item input function 98.

FIG. 16 is a diagram showing a typical internal configuration of a system in which the monitoring PC 5 has the work-item input function 98. Explanation of elements shown in the figure as elements identical with those shown in FIG. 14 is omitted. A supervisor on the facility side verifies an operation carried out by a worker on the same side and enters the verified operation. Work condition data is accepted by the work-item input function 98 employed in the monitoring PC 5.

Figure 17:
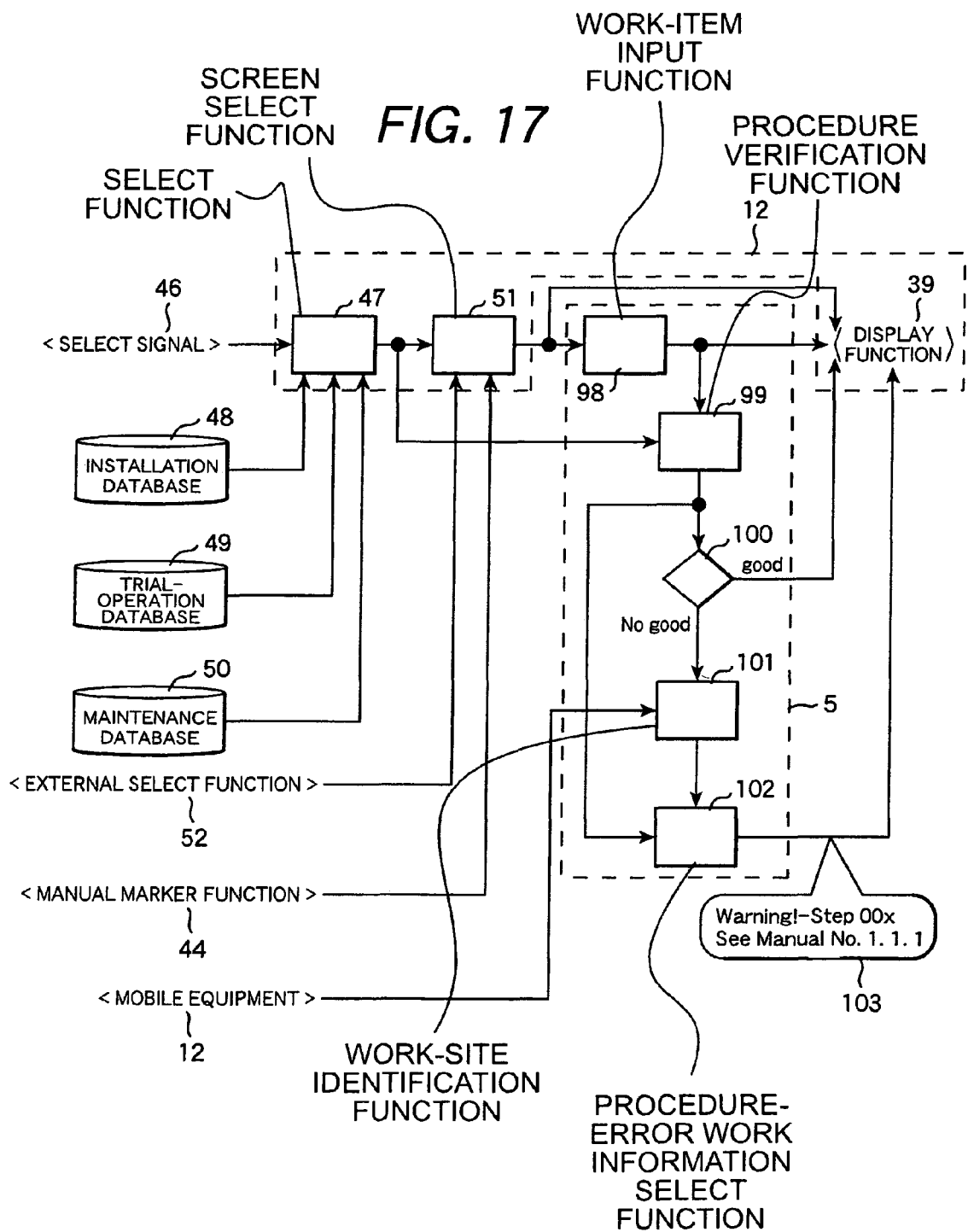
FIG. 17 is an explanatory diagram showing a configuration in which the monitoring PC 5 has functions of the center PC 9 shown in FIG. 15.

FIG. 17 is a diagram showing a typical internal configuration of a system in which the monitoring PC 5 has the function of center PC 9 shown in FIG. 15. Explanation of elements shown in the figure as elements identical with those shown in FIG. 14 is omitted. In this monitoring system, a procedure error can be confirmed even at the site.

By virtue of the embodiments described above, a work to install a facility at an electric-power generation plant, a trial operation at the plant and a maintenance work at the plant can be supported by using an image, a voice, an email and design data, which are transmitted from a monitoring system installed at a location remote from the plant.

Thus, even if the language spoken by a worker is different from the language of the supporter, intentions of the worker and the supporter can be exchanged between them and understood by them in both directions smoothly.

In addition, a work instruction can be given in a real-time manner in a system comprising a monitoring apparatus for periodically collecting and recording input/output process values of an operation control apparatus employed in a facility of interest as well as periodically collecting and recording control signals of the operation control apparatus, a plurality of mobile equipment composing a local network together with the monitoring apparatus, image/voice input/output apparatus connectable to the mobile equipment and a monitoring server for monitoring the information, which are collected and recorded in the monitoring apparatus, through a pay station line.

On the top of that, by using any one of the following functions, necessary information on a work can be obtained without a departure from a work site. The functions include a function for automatically displaying information on maintenance of a member to be inspected, a function for displaying inform on assembly of the member and a component or replacement tolerance values, a tolerance-range display function for displaying process values used for evaluating the normalcy of the member, a digital-image-capture function and a function for recording additional information in the information acquired by the other functions. (The information on maintenance of a member is a visual manual showing, among others, drawings of components, a repair history and disassembly/assembly procedures. Examples of the replacement values are a clearance and a wear amount. The additional information includes a written memorandum and a sketch.)

Furthermore, the automatic display function for automatically displaying information on maintenance of a member receives a signal transmitted by radio communication from an tag installed in advance at a necessary location of a facility of interest as an tag having a recording function and, by execution of a function to select and disclose corresponding information, work information necessary for an apparatus of interest can be obtained without the need to search for the work information.

Moreover, by execution of a function for updating an inspection or repair history input to the mobile equipment, the tag is capable of preventing inspections and examinations from being overlooked due to human errors for example at periodical inspection and repair times.

In addition, the display functions of each mobile equipment, the monitoring server and the center PC each include a function to display the same information on the screens or a function to mutually share the same displayed information. Assume for example that information on a cursor of any specific one of the mobile equipment, the monitoring server and the center PC is changed. In this case, the mobile equipment, the monitoring server and the center PC each have a function that allows information on cursors of the mobile equipment, the monitoring server and the center PC other than the specific one to be changed so that the cursors all move to the same coordinates. In this way, mutual understanding of intentions can be assured.

On the top of that, a function for communicating only a change in cursor position increases the communication speed even if a transmission line having a small communication capacity is used.

In the embodiments described above, the mobile equipment 12 communicates with the center PC 9 employed in the monitoring center 4 through the monitoring PC 5. It is to be noted, however, that the mobile equipment 12 may also communicate with the center PC 9 employed in the monitoring center 4 directly.

Furthermore, it is also possible to provide a configuration in which the function of the monitoring PC 5 is included in the mobile equipment 12 so that the mobile equipment 12 is capable of communicating with the center PC 9 employed in the monitoring center 4 directly.

Moreover, it is also possible to provide a configuration in which an image of a facility being monitored is stored in not only the monitoring PC 5 but also a database provided in the mobile equipment 12 as a database for allowing the image to be stored in the mobile equipment 12 as well.

The functions of apparatus such as the monitoring PC 5, the center PC 9 and the mobile equipment 12 can each be performed as a program executed by a computer. The programs for performing the functions can be stored on a recording medium to be read out by the computer for execution.

The present invention has been proposed a system for supporting works done at a remote site by using images, voices, emails and design data. The system is also applicable to work support for not only an electric-power generation facility, but also other facilities such as a manufacturing plant and a chemical plant in which an installation work, a trial operation and a daily maintenance work are necessary.

What is claimed is:

1. A monitoring system, comprising:
a monitoring computer for monitoring a facility;
a monitoring center computer coupled to said monitoring computer for monitoring information of said monitoring computer and transmitting information to said monitoring computer;

a plurality of mobile equipment each connected to said monitoring computer by a communication line; and a database used for storing manual work item data of a manual prepared for work to be done by a worker, said monitoring system characterized in that:

each of said mobile equipment has:

a display means for displaying said manual work item data stored in said database; and a work-item input means for inputting a work item of a work condition as a condition of said work done by said worker;

said monitoring computer has:

a reception means for receiving the work item of said work condition from any one of said mobile equipment; and a condition transmission means for transmitting the work item of said work condition to said monitoring center computer; and said monitoring center computer has:

a procedure verification means for comparing the work item of said work condition entered from any one of said mobile equipment with said manual work item data stored in said database;

a work-site verification means for identifying a specific mobile equipment corresponding to a work site of a work indicated by a comparison result produced by said procedure verification means as a state of work with the work item of said work condition thereof not matching said manual work item data; and an error transmission means for, when there is a procedure error by the worker wherein the procedure error corresponds to the work item of said work condition not matching said manual work item data, transmitting error recovery information of a manual work item data for a recovery from said work procedure error to said specific mobile equipment corresponding to a work site at which the work item of said work condition thereof does not match said manual work item data so that the error recovery information is shown on said display of said specific mobile equipment.

2. A monitoring system comprising:

a monitoring computer for monitoring a facility;

a plurality of mobile equipment each connected to said monitoring computer by a communication line; and a database used for storing manual work item data of a manual prepared for a work to be done by a worker, said monitoring system characterized in that:

each of said mobile equipment has:

a display means for displaying said manual work item data stored in said database; and a work-item input means for inputting a work item of a work condition as a condition of said work done by said worker;

said monitoring computer has:

a reception means for receiving the work item of said work condition from any one of said mobile equipment;

a procedure verification means for comparing the work item of said work condition entered from any one of said mobile equipment with said manual work item data stored in said database;

a work-site verification means for identifying a specific mobile equipment corresponding to a work site of a work indicated by a comparison result produced by said procedure verification means as a state of work with the item of said work condition thereof not matching said manual work item data; and an error transmission means for, when there is a procedure error by the worker wherein the procedure error corresponds to the work item of said work condition not matching said manual work item data, transmitting error recovery information of a manual work item data for a recovery from said work procedure error to said specific mobile equipment corresponding to a work site at which the work item of said work condition thereof does not match said manual work item data so that the error recovery information e is shown on said display of said specific mobile equipment.

3. A monitoring center computer, comprising:

a database used for storing manual work item data of a manual prepared for a work to be done by a worker;

a procedure verification means for comparing a work item of a work condition as a condition of work done by a worker with said manual work item data stored in said database;

a work-site verification means for identifying mobile equipment corresponding to a work site of a work indicated by a comparison result produced by said procedure verification means as a state of work with the work item of said work condition thereof not matching said manual work item data; and an error transmission means for, when there is a procedure error by the worker wherein the procedure error corresponds to the work item of said work condition not matching said manual work item data, transmitting error recovery information of a manual work item data for a recovery from said work procedure error to said mobile equipment corresponding to a work site at which the work item of said work condition thereof does not match said manual work item data so that the error recovery information is shown on said display of said specific mobile equipment.

4. A monitoring center computer according to claim 3, characterized by further including:

a reception means for receiving information representing an image of said monitored facility; and a work-item input means for inputting a work condition as a condition of said work done by said worker.

5. A monitoring center computer according to claim 3, characterized by further including a reception means for receiving a work condition to be compared by said procedure verification means from one of said mobile equipment.

6. A monitoring center computer according to claim 3, characterized in that said error transmission means is a transmission means for transmitting information to be used for a process of recovery from a procedure error.

* * * * *